United States Patent [19]

Ogata et al.

[11] Patent Number: 4,741,259
[45] Date of Patent: May 3, 1988

[54] COFFEE MAKER HAVING A DETACHABLE CASSETTE CONTAINING THE PUMP AND HEATER ASSEMBLY

[75] Inventors: Shiro Ogata; Kazutoshi Konaka, both of Tokyo, Japan

[73] Assignee: U.S. Philips Corporation, New York, N.Y.

[21] Appl. No.: 42,496

[22] Filed: Apr. 24, 1987

[30] Foreign Application Priority Data

Apr. 29, 1986 [EP] European Pat. Off. ............ 86200728

[51] Int. Cl.⁴ .............................................. A47J 31/00
[52] U.S. Cl. ....................................... 99/279; 99/281; 99/307; 219/283; 219/297
[58] Field of Search ................. 99/279, 280, 281, 282, 99/283, 284, 300, 306, 290, 288, 302 R, 304, 307, 316; 219/283, 297; 426/433

[56] References Cited

U.S. PATENT DOCUMENTS

| | | | |
|---|---|---|---|
| 4,083,295 | 4/1978 | Hollingsworth | 99/283 |
| 4,155,292 | 5/1979 | Rickert | 99/306 |
| 4,188,864 | 2/1980 | Fischer | 219/283 |
| 4,546,697 | 10/1985 | Schaeffer | 99/281 |
| 4,508,023 | 4/1985 | Naya | 99/284 |

FOREIGN PATENT DOCUMENTS

| | | | |
|---|---|---|---|
| 1944578 | 3/1969 | Fed. Rep. of Germany | 99/279 |
| 2489683 | 3/1982 | France | 99/281 |

Primary Examiner—Robert W. Jenkins
Attorney, Agent, or Firm—Ernestine Bartlett

[57] ABSTRACT

In a coffee maker having a housing 1, a flow heater 6, a water reservoir 4 and a filter device 3 the flow heater is accommodated in a cassette 10 which is detachably mounted in the housing 1. By detaching the cassette from the coffee maker the electrical parts are completely separated from the housing. The detached cassette permits the housing of the coffee maker to be immersed in water during cleaning.

8 Claims, 1 Drawing Sheet

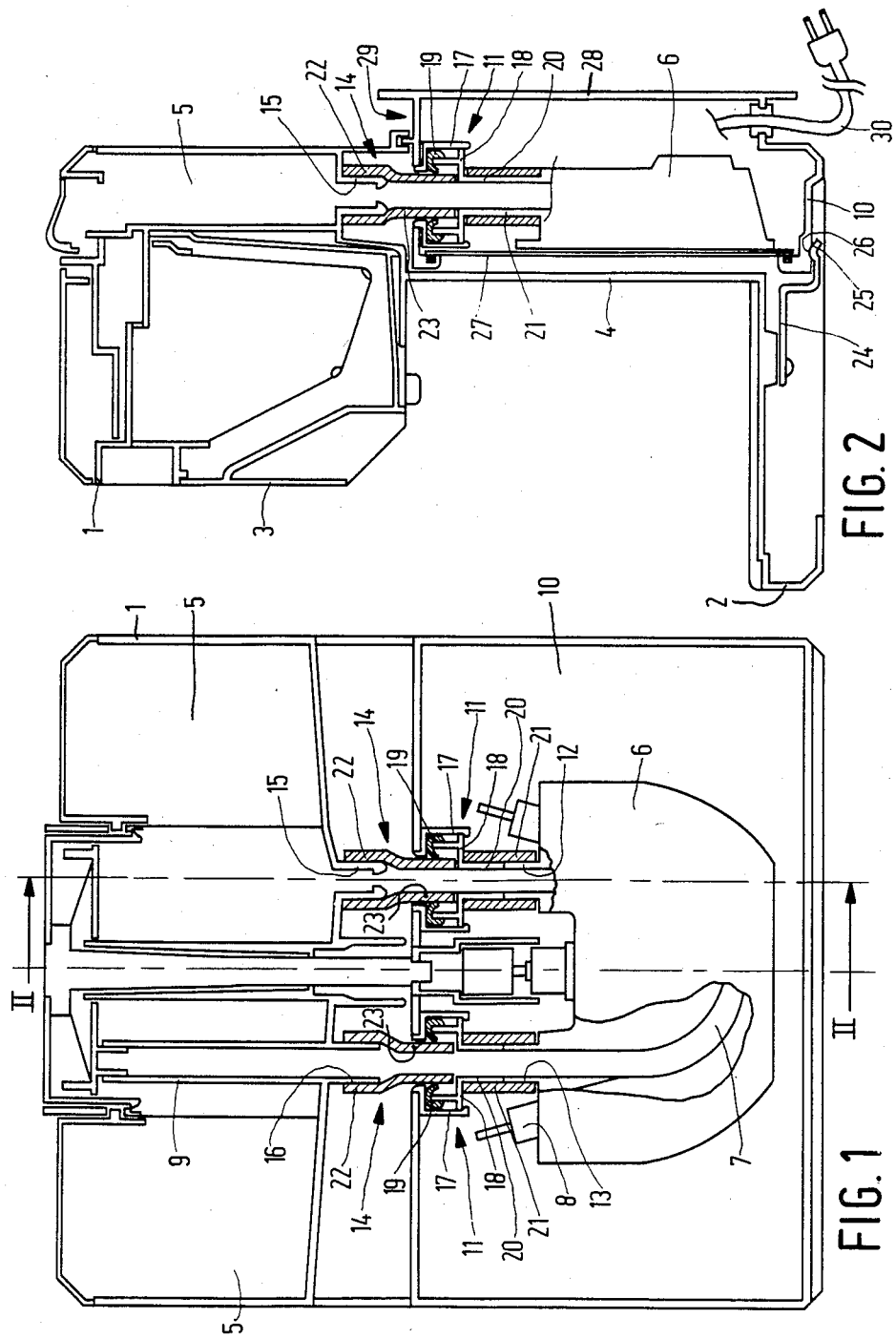

COFFEE MAKER HAVING A DETACHABLE CASSETTE CONTAINING THE PUMP AND HEATER ASSEMBLY

This invention relates to a coffee maker comprising a housing, a water reservoir, a filter device, and a flow heater. The flow heater has a pump chamber and a heating element which is in thermal contact with the pump chamber. The flow heater is arranged to supply hot water to the filter device.

Such a coffee maker is generally known, see e.g. GB No. 2156663. A problem that arises in coffee makers is that they become dirty during use due to spillage of coffee extract and coffee powder. Dirty coffee makers are often difficult to clean. It is not permissible to immerse the coffee maker in water in order to clean it, because of the electrical parts. Cleaning can only be done by means of a wet cloth.

SUMMARY OF THE INVENTION

The object of the invention is to provide a coffee maker which is easy to clean.

According to the invention there is provided a coffee maker having the flow heater accommodated in a cassette which is detachably mounted in the housing. Detaching the cassette with the flow heater from the housing of the coffee maker means that the electrical parts are separated from the housing so that the housing and filter device can be immersed in a cleaning solution, for example, washing water.

In a preferred form of a coffee maker in accordance with the invention coupling means are provided for both an inlet and an outlet of the water chamber to establish a watertight connection with an outlet of the water reservoir and with a riser pipe to the filter device, respectively.

Each coupling means comprises a female portion and a male portion, said female portion having two annular parts between which a rubber ring is compressed and a rubber sleeve connected to the inlet or outlet, respectively, of the pump chamber. The male portion has a rubber or plastics tube which is connected to the outlet of the water reservoir or the inlet of the riser pipe, respectively, and which is insertable into the respective female portion to establish the watertight connection between the rubber or plastics tube and the respective rubber ring.

In a further preferred form of a coffee maker in accordance with the invention there are clamping means for clamping the cassette to the housing.

In another preferred form of a coffee maker in accordance with the invention an outside wall of the cassette is arranged to be heated by the flow heater and is constructed to serve as a warming plate.

In still another preferred form of a coffee maker in accordance with the invention the cassette comprises storage means for an electric supply cord.

An embodiment of the invention will now be described with reference to the accompanying schematic drawings.

DESCRIPTION OF THE FIGURES

FIG. 1 is a sectional elevation of a coffee maker in accordance with the invention, and FIG. 2 is a sectional view of the coffee maker taken on the line II—II of FIG. 1.

DESCRIPTION OF THE PREFERRED EMBODIMENT

The coffee maker shown in the drawings comprises a housing 1 of substantially rectangular shape in front elevation, formed by injection moulding from a plastics material. The housing has a base 2 on which a coffee jug or one or more coffee cups can be placed beneath a filter device 3. Connected to the base is an upstanding wall 4 on which is supported a U-shaped reservoir 5 which can be filled with cold water, the legs of the U extending horizontally. The filter device can be inserted between the horizontal legs of the U-shaped reservoir. However, this is not visible in the drawings. The coffee maker further comprises a flow heater 6 having a pump chamber 7 and an electrical heating element 8. The heating element is in thermal contact with the pump chamber so that cold water from the water reservoir entering the pump chamber is heated and pumped up through a riser pipe 9 to the filter device 3.

The flow heater 6 is accommodated in a cassette 10 which is detachably mounted in the housing 1. The detachability of the cassette is achieved by the provision of coupling means for both an inlet 12 and an outlet 13 of the pump chamber 7. Each coupling means comprises a female portion 11 on the inlet 12 or outlet 13 respectively, and a male portion 14 on an outlet 15 of the water reservoir 5 and an inlet 16 of the riser pipe 9 respectively. Each female portion 11 comprises two annular parts 17 and 18 between which a rubber sealing ring 19 is compressed. The lower annular part 18 is provided with a tubular portion 20. For the connection of each female portion to the pump chamber there is provided a rubber sleeve 21 between the tubular portion 20 and the inlet 12, outlet 13 of the pump chamber respectively. Each male portion 14 consists of a rubber tube 22 connected to the outlet 15 of the reservoir 5 and the inlet 16 of the riser pipe 9 respectively.

When mounting the cassette 10 in the housing 1 the free ends 23 of both rubber or plastics tubes 22 are slid into the annular parts 17, 18, thereby establishing a watertight seal between the rubber sealing rings 19 and the rubber or plastics tubes 22.

For the attachment of the cassette 10 to the housing 1 there are provided clamping means. These means comprise a leaf spring 24, one end of which is secured to the base 2. The other, free end is bent to form a protrusion 25 which is located under spring force in a recess 26 in the cassette wall.

An outside wall 27 of the cassette 10 is arranged to be heated by the flow heater and is constructed to serve as a warming plate. This warming plate is in thermal contact with a surface of the aluminium casting in which the pump chamber and the heating element are located. In the described example the warming plate can be used independently of the coffee maker by placing the cassette with its rear wall 28 on a table. It is also possible in another embodiment of the coffee maker in which the flow heater is positioned in a horizontal direction to use the warming plate to support a coffee jug and to keep the coffee warm.

The cassette 10 may further comprise storage means 29 to store the electric supply cord 30 or a part thereof. To this end the rear wall 28 of the cassette is constructed as a flange so that the rear part of the cassette together with a part of the housing wall form a channel 29 in which the cord can be wound.

Having thus described my invention in terms of one embodiment, what we claim as new and novel is as follows:

1. A coffee maker of the type comprising a housing, a water reservoir, a filter device, and a flow heater having a pump chamber and a heating element which is in thermal contact with the pump chamber, said flow heater being arranged to supply hot water to the filter device, further comprising a cassette which is detachably mounted in the housing containing said flow heater, said flow heater having a detachable inlet and outlet connection which permits said cassette to be removed.

2. A coffee maker as claimed in claim 1, in which the pump chamber is connected to said inlet and outlet, and coupling means are provided for both the inlet and the outlet to establish a watertight connection with an outlet of the water reservoir and with a riser pipe to the filter device respectively.

3. A coffee maker as claimed in claim 2, wherein each coupling means comprises a female portion and a male portion, said female portion having two annular parts between which a rubber ring is compressed and a rubber sleeve connected to the inlet or outlet respectively, of the pump chamber and said male portion having a tube which is connected to the outlet of the water reservoir or the inlet of the riser pipe respectively, and which is insertable into the respective female portion to establish the watertight connection between the rubber or plastics tube and the respective rubber ring.

4. A coffee maker as claimed in claim 1, further comprising clamping means for clamping the cassette to the housing.

5. A coffee maker as claimed in claim 1, wherein an outside wall of the cassette is heated by the flow heater and serves as a warming plate.

6. A coffee maker as claimed in claim 1, wherein the cassette further comprises storage means for an electric supply cord.

7. An electric coffee maker comprising:
   a housing having a base which supports a coffee jug, an upstanding vertical wall supporting a U-shaped reservoir for receiving cold water;
   a filter compartment between first and second horizontal legs of said U-shaped reservoir including a riser tube for supplying heated water; and
   a detachable cassette supported to the rearward side of said vertical wall, said cassette including a pump chamber connected at a first end through a detachable coupling to said reservoir, a heater for heating said pump chamber, a second detachable coupling connecting a second end of said pump chamber to an end of said riser tube, whereby heated water is delivered to said coffee filter, said cassette and its contents being separable from said housing whereby said housing may be immersed in water.

8. The electric coffee maker of claim 7 wherein said detachable couplings each comprise:
   a female portion including a tubular member supporting at one end thereof first and second annular parts separated by a sealing ring; and
   a male portion comprising a flexible tube having a free end inserted in said annular parts sealed by said sealing ring.

* * * * *